US009399946B2

(12) United States Patent
Owens

(10) Patent No.: US 9,399,946 B2
(45) Date of Patent: Jul. 26, 2016

(54) HYDROGEN SUPPLEMENTAL SYSTEM FOR ON-DEMAND HYDROGEN GENERATION FOR INTERNAL COMBUSTION ENGINES

(71) Applicant: Donald W. Owens, Temecula, CA (US)

(72) Inventor: Donald W. Owens, Temecula, CA (US)

(*) Notice: Subject to any disclaimer, the term of this patent is extended or adjusted under 35 U.S.C. 154(b) by 69 days.

(21) Appl. No.: 13/842,102

(22) Filed: Mar. 15, 2013

(65) Prior Publication Data
US 2013/0174797 A1    Jul. 11, 2013

Related U.S. Application Data

(63) Continuation-in-part of application No. 13/224,338, filed on Sep. 2, 2011, now Pat. No. 8,449,754.

(51) Int. Cl.
| | | |
|---|---|---|
| *C25B 1/10* | (2006.01) | |
| *C25B 15/02* | (2006.01) | |
| *C25B 15/08* | (2006.01) | |
| *F02B 43/10* | (2006.01) | |

(Continued)

(52) U.S. Cl.
CPC . *F02B 43/10* (2013.01); *C25B 1/04* (2013.01); *C25B 1/10* (2013.01); *C25B 15/02* (2013.01); *C25B 15/08* (2013.01); *F02M 25/12* (2013.01); *Y02E 60/366* (2013.01); *Y02E 70/10* (2013.01); *Y02E 70/20* (2013.01); *Y02T 10/121* (2013.01); *Y02T 10/16* (2013.01); *Y02T 10/32* (2013.01)

(58) Field of Classification Search
CPC ............ C25B 1/04; C25B 1/10; C25B 15/02; C25B 15/08; F02B 43/10
USPC .......................................... 204/263; 205/628
See application file for complete search history.

(56) References Cited

U.S. PATENT DOCUMENTS

| | | |
|---|---|---|
| 3,252,455 A | 5/1966 | Marshall |
| 3,433,729 A | 3/1969 | Mikhailovich et al. |
| 4,025,405 A | 5/1977 | Dotson et al. |

(Continued)

FOREIGN PATENT DOCUMENTS

| | | |
|---|---|---|
| DE | 19504142 | 8/1995 |
| WO | 2009018814 | 2/2009 |
| WO | 2011150322 | 12/2011 |

OTHER PUBLICATIONS

J. Russell, et al "Hydrogen Generation by Solid Polymer Electrolyte Water Electrolysis", American Chemical Society, Chicago Symposium 1973, pp. 24-40.

(Continued)

*Primary Examiner* — Nicholas A Smith

(57) ABSTRACT

A portable on-demand hydrogen supplemental system is provided for producing hydrogen gas and injecting the hydrogen gas into the air intake of internal combustion engines. Hydrogen and oxygen is produced by a fuel cell from nonelectrolyte water in a nonelectrolyte water tank. The hydrogen gas is passed through a hydrogen gas collector. Nonelectrolyte water mixed with the hydrogen gas in the hydrogen gas collector is passed back thru the tank for distribution and water preservation. The system can be powered by the vehicles alternator, a stand-alone battery, waste heat or solar energy. The system utilizes an onboard diagnostic (OBD) interface in communication with the vehicle's OBD terminal, to regulate power to the system so that hydrogen production for the engine only occurs when the engine is running. The hydrogen gas is produced it is immediately consumed by the engine. No hydrogen is stored on, in or around the vehicle.

15 Claims, 10 Drawing Sheets

(51) Int. Cl.
*C25B 1/04* (2006.01)
*F02M 25/12* (2006.01)

(56) References Cited

U.S. PATENT DOCUMENTS

| | | | |
|---|---|---|---|
| 4,031,865 A | 6/1977 | Dufour | |
| 4,271,793 A | 6/1981 | Valdespino | |
| 4,368,696 A | 1/1983 | Reinhardt | |
| 5,272,871 A | 12/1993 | Oshima et al. | |
| 5,711,865 A | 1/1998 | Caesar | |
| 6,033,549 A | 3/2000 | Peinecke et al. | |
| 6,257,175 B1 | 7/2001 | Mosher et al. | |
| 6,688,120 B2 | 2/2004 | Aoki et al. | |
| 7,021,249 B1 | 4/2006 | Christison | |
| 7,143,722 B2 | 12/2006 | Ross | |
| 7,458,368 B1 | 12/2008 | Huffman | |
| 7,552,702 B2 | 6/2009 | Stone | |
| 7,981,556 B2 * | 7/2011 | Shiroma et al. | 429/437 |
| 2004/0013918 A1 | 1/2004 | Merida-Donis | |
| 2004/0025808 A1 | 2/2004 | Cheng | |
| 2004/0203166 A1 | 10/2004 | Sullivan | |
| 2005/0229872 A1 | 10/2005 | Lange | |
| 2007/0151865 A1 | 7/2007 | Shimko et al. | |
| 2007/0205111 A1 | 9/2007 | Bayliss | |
| 2007/0209608 A1 | 9/2007 | Rutledge | |
| 2007/0259220 A1 | 11/2007 | Redmond | |
| 2008/0257751 A1 | 10/2008 | Smola et al. | |
| 2009/0188240 A1 | 7/2009 | Suzuki et al. | |
| 2009/0283402 A1 | 11/2009 | Osman | |
| 2010/0012090 A1 | 1/2010 | Lewis | |
| 2010/0031977 A1 * | 2/2010 | Sales | 134/39 |
| 2010/0183931 A1 | 7/2010 | Hedman | |
| 2010/0236921 A1 | 9/2010 | Yang | |
| 2010/0275858 A1 | 11/2010 | Jeffs et al. | |
| 2011/0048961 A1 | 3/2011 | Smedley | |
| 2011/0185990 A1 * | 8/2011 | Inwald | 123/3 |
| 2011/0290201 A1 | 12/2011 | Owens | |
| 2012/0055422 A1 | 3/2012 | Owens | |
| 2012/0073521 A1 | 3/2012 | Owens | |
| 2012/0073522 A1 | 3/2012 | Owens | |
| 2012/0073523 A1 | 3/2012 | Owens | |
| 2012/0073524 A1 | 3/2012 | Owens | |
| 2012/0073525 A1 | 3/2012 | Owens | |
| 2013/0037003 A1 * | 2/2013 | Sheerin | 123/445 |

OTHER PUBLICATIONS

C. Kim et al, "Hydrogen Production from Water Using Polymer Electrolyte Membrane", American Institute of Chemical Engineers, Nov. 7, 2004.

I. Papagiannakis, "Studying and Improving the Efficiency of Water Electrolysis using a Proton Exchange Membrane", Thesis Submitted to Strathclyde University, 2005.

* cited by examiner

HYDROGEN SUPPLEMENTAL SYSTEM FOR ON-DEMAND HYDROGEN GENERATION FOR INTERNAL COMBUSTION ENGINES

CROSS-REFERENCES

This is a continuation-in-part application of U.S. application Ser. No. 13/224,338, filed Sep. 2, 2011 which is a continuation-in-part application of U.S. application Ser. No. 12/790,398, filed May 28, 2010, the contents of which are incorporated herein by reference.

BACKGROUND OF THE INVENTION

1. Field of the Invention

The present invention relates to hydrogen generation devices. More particularly, the present invention relates to a hydrogen supplemental system that can be used with internal combustion engines for increased fuel efficiency and reduced carbon emissions.

2. Description of the Related Art

There are a number of devices on the market that create HHO gas, otherwise known as Brown's gas, which is used as a supplement to gasoline and diesel engines. HHO gas consists of two parts hydrogen to one part oxygen. These devices typically comprise an electrolyzer which decomposes water into hydrogen and oxygen. An example is U.S. Pat. No. 3,368,696. These electrolyzers typically use an electrolyte, most notably KOH, Potassium hydroxide, or baking soda. A voltage is placed across the device to produce the HHO gas.

The main problem with most of these devices is that the energy required to produce the hydrogen creates a substantial load on the electrical system of the vehicle. Similar to running the air conditioner in any vehicle, the additional electrical load causes the miles per gallons to be reduced. Even though the hydrogen typically boosts the efficiency and miles per gallon of the vehicle, the additional electrical load on the vehicle to create the hydrogen is usually great enough to minimize or in many cases negate most or all of mileage gains of the vehicle.

Also, most HHO systems produce the hydrogen and oxygen in a combined gas stream. The hydrogen and oxygen gases are not generally separated from each other. In the case of modern gasoline powered vehicles, this extra oxygen is detected by the vehicle's oxygen sensors which communicate this extra oxygen level to an on-board computer, namely and Electronic Control Unit ECU of the vehicle. When the ECU detects this extra oxygen, it is a signal that the engine is running lean and the ECU adds more gasoline to the engine. This also negates most of the fuel efficiency gains.

Furthermore, HHO systems generally use either baking soda or Potassium Hydroxide KOH. KOH is generally preferred over baking soda because of its stability and because it causes less deterioration of stainless steel plates or other plates used in the electrolyzer. However, KOH has to be handled with care because it is caustic, and the crystals can be dangerous if not handled properly. The electrolyte normally has to be inserted into the unit at the proper proportions for optimum operation of the electrolyzer. Extreme care must be taken when using it. It is not the type of product you would generally like to put in the hands of an inexperienced consumer.

Complex installation is another issue with typical HHO systems. Space usually has to be found somewhere in the engine compartment or outside the vehicle. Since all vehicles are different, finding a suitable spot under the hood to install the device in many vehicles is next to impossible. Also, the systems are typically connected into the electrical systems of the vehicles which can cause blown fuses and a host of other problems if not installed properly. Hydrogen is only needed when the vehicle is actually running, not when the ignition is turned on. During the installation, care must be observed to make sure the electrical power is provided to the device only when the engine is running. Otherwise there can be hydrogen accumulation in the air intake. This further complicates the installation of these systems.

SUMMARY OF THE INVENTION

The present invention relates to a portable and compact, on-demand hydrogen supplemental system for producing hydrogen gas and injecting the hydrogen gas into the air intake of internal combustion engines, particularly for vehicles. Hydrogen and oxygen is produced by a fuel cell at low temperatures and pressure from nonelectrolyte water in a nonelectrolyte water tank. The hydrogen gas is passed through a hydrogen gas collector. Nonelectrolyte water mixed with the hydrogen gas in the hydrogen gas collector is passed back thru the nonelectrolyte water tank for distribution and water preservation. The hydrogen gas and the oxygen gas travel in separate directions, therefore the gases are kept separate. In the case of gasoline engines, the hydrogen gas is directed to the air intake of the engine while the oxygen gas is optionally vented to the atmosphere. The system can be powered by the vehicles alternator, a stand alone battery, waste heat or solar energy. The system utilizes an engine sensor or an onboard diagnostic (OBD) interface in communication with the vehicle's OBD terminal, to regulate power to the system and therefore hydrogen production for the engine only occurs when the engine is running. Therefore as the hydrogen gas is produced it is immediately consumed by the engine. No hydrogen is stored on, in or around the vehicle.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a hydrogen supplemental system used to increase the fuel efficiency and reduce carbon emissions for internal combustion engines. The present invention provides various embodiments as described below. However it should be noted that the present invention is not limited to the embodiments described herein, but could extend to other embodiments as would be known or as would become known to those skilled in the art.

Figure 1:
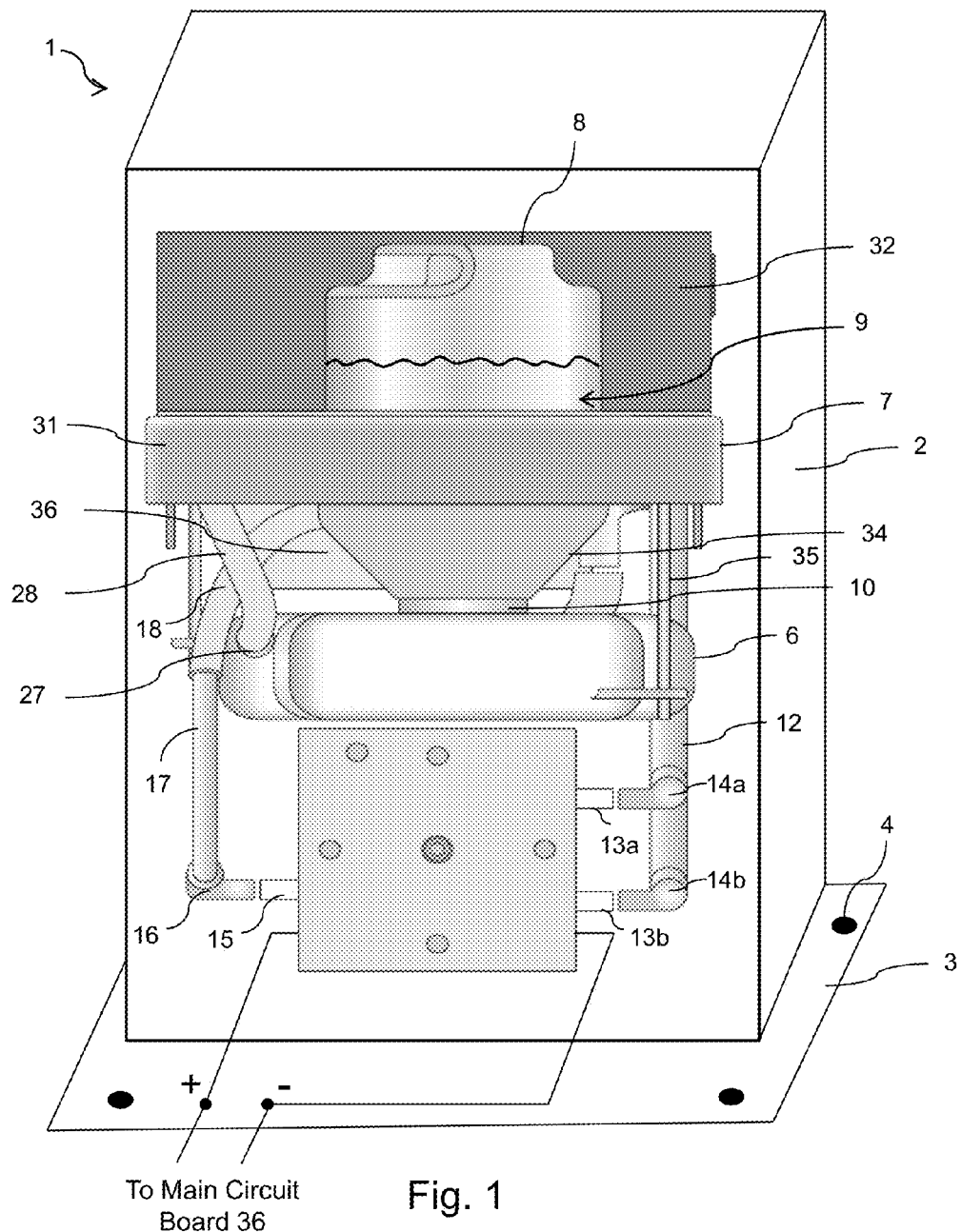
FIG. 1 is a detailed drawing of a front view of a portable hydrogen supplemental system showing a water tank and other components of an interior housing design according to the present invention.

Various components of a portable hydrogen supplemental system 1 are discussed below with reference to FIGS. 1 through 4. The present invention as shown in FIG. 1 provides the portable hydrogen supplemental system 1 which includes a housing unit 2 that can be secured in the trunk or other flat surface of a vehicle by mounting bracket 3 and fastening units 4. Inside the housing unit 2 are a fuel cell 5 and a nonelectrolyte water tank 6 positioned above the fuel cell 5. A cup portion 7 is disposed above the nonelectrolyte water tank 6 and is configured to receive a water container 8 therein for supplying nonelectrolyte water 9 to the nonelectrolyte water tank 6. The nonelectrolyte water tank 6 is arranged above the fuel cell 5, in such a manner as to supply nonelectrolyte water 8 to the fuel cell 5 by gravity. The nonelectrolyte water tank 6 is supported in the housing unit 2 above the fuel cell 5 by supporting means (not shown). The housing unit 2 is designed to be readily removable from the mounting bracket 3.

Figure 2:
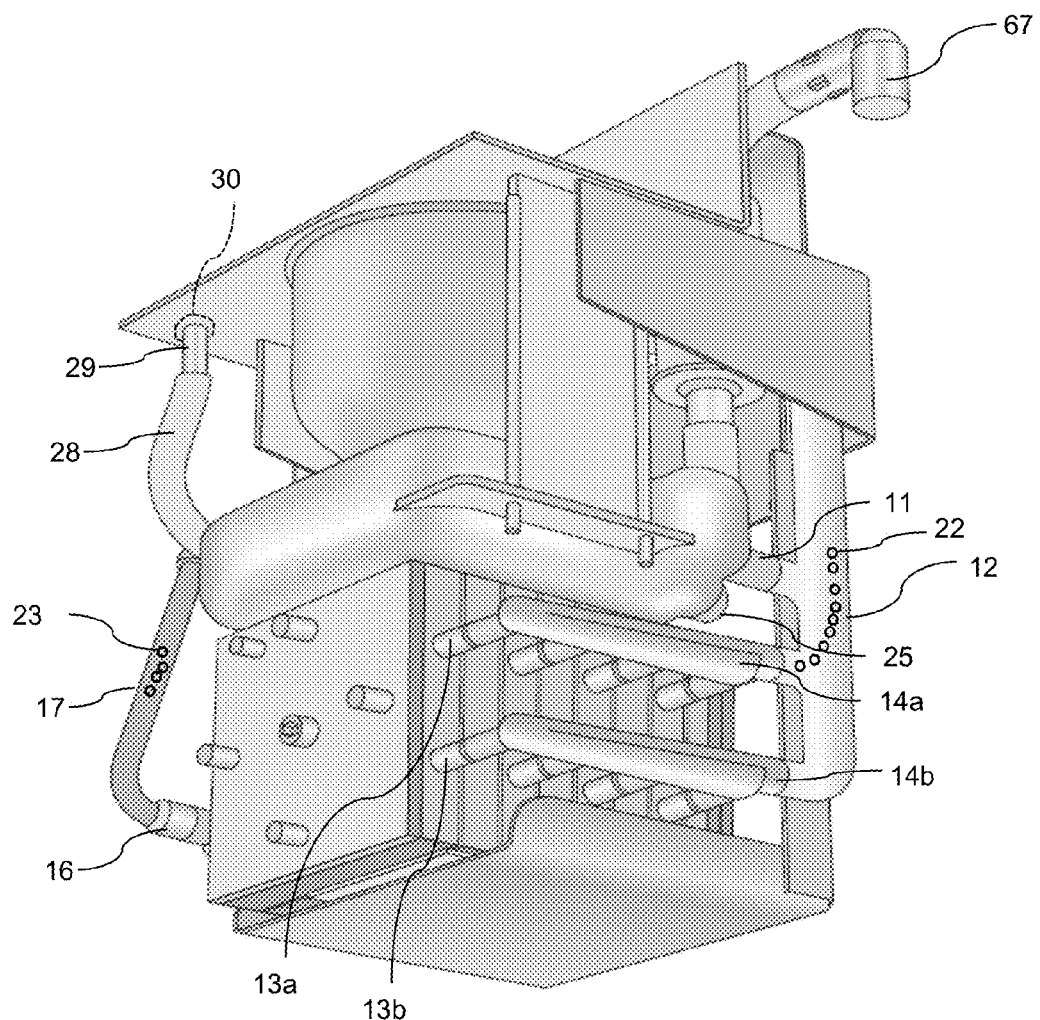
FIG. 2 is a detailed drawing of a left side view of the portable hydrogen supplemental system according to the present invention.

The nonelectrolyte water tank 6 includes a fill spout 10 at a top portion thereof for receiving the cup portion 7, a water supply fitting 11 (as shown in FIG. 2) positioned on a rear side thereof connected to a tube or other supply means 12 that is in turn connected to water inlet fittings 13a and 13b on the fuel cell 5 by first and second manifolds 14a and 14b. Nonelectrolyte water 9 is supplied to the fuel cell 5 by the supply means 12. The fuel cell 5 also includes hydrogen gas outlet fittings 15 connected via a third manifold 16 (as depicted in FIG. 3) and tubes or additional supply means 17 and a fitting 18, to a hydrogen gas collector 20 (as depicted in FIG. 4) mounted to a rear of the cup portion 7 via a gas inlet fittings 21.

The nonelectrolyte water tank 6 further includes a sensor port 25 (as shown in FIG. 2) for receiving a water level sensor. The water level sensor is configured to sense a water level of the nonelectrolyte water tank 6. A temperature sensor may also be provided. The temperature sensor may be mounted within the nonelectrolyte water tank 6 or any suitable location within the housing 2 and is configured to sense a temperature of the nonelectrolyte water 9. A heater may further be provided along a surface of the electrolyzer 5, mounted to a sub-housing assembly or any suitable location within the housing 2, and configured to heat the nonelectrolyte water 9 when it is detected via the temperature sensor that the nonelectrolyte water 9 has dropped below a predetermined temperature (e.g., 32 degrees). The nonelectrolyte water tank 6 also includes tank vent port 27 for releasing air trapped within the nonelectrolyte water tank 6 via a tube or other supply means 28 connected via a fitting 29, to an outlet 30 formed within the cup portion 7.

The cup portion 7 further includes a plurality of flange portions including a first flange portion 31 disposed in a horizontal direction parallel to a top portion of the nonelectrolyte water tank 6, and a second flange portion 32 disposed in a vertical direction and connected with or integrally combined with a rear or back side of the first flange portion 31. The cup portion 7 further includes a container receiving portion 34 for receiving the water container 8 therein. The cup portion 7 is mounted above the nonelectrolyte water tank 6 via supporting structures 35 or other supporting means.

Figure 3:
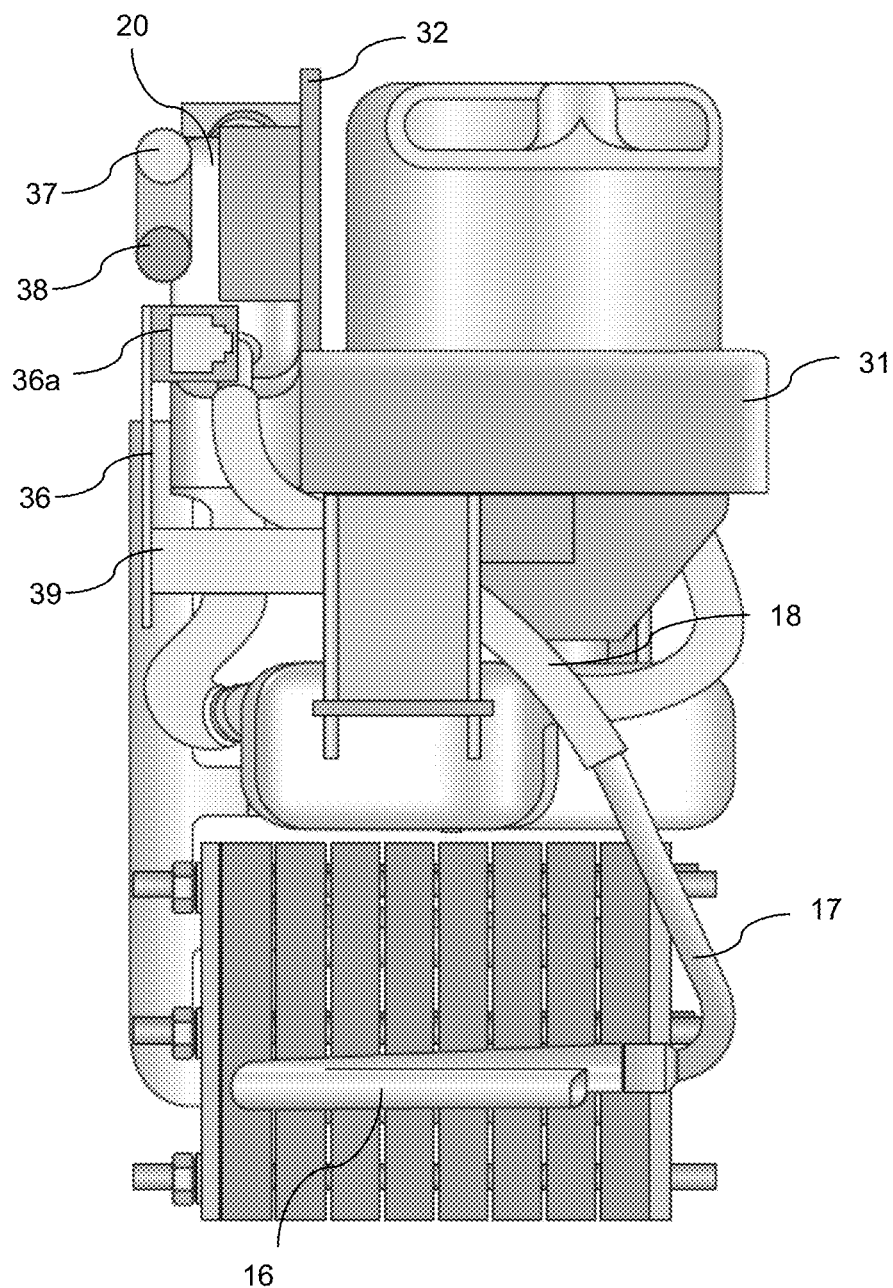
FIG. 3 is a detailed drawing of a right side view of the portable hydrogen supplemental system according to the present invention.
Figure 4:
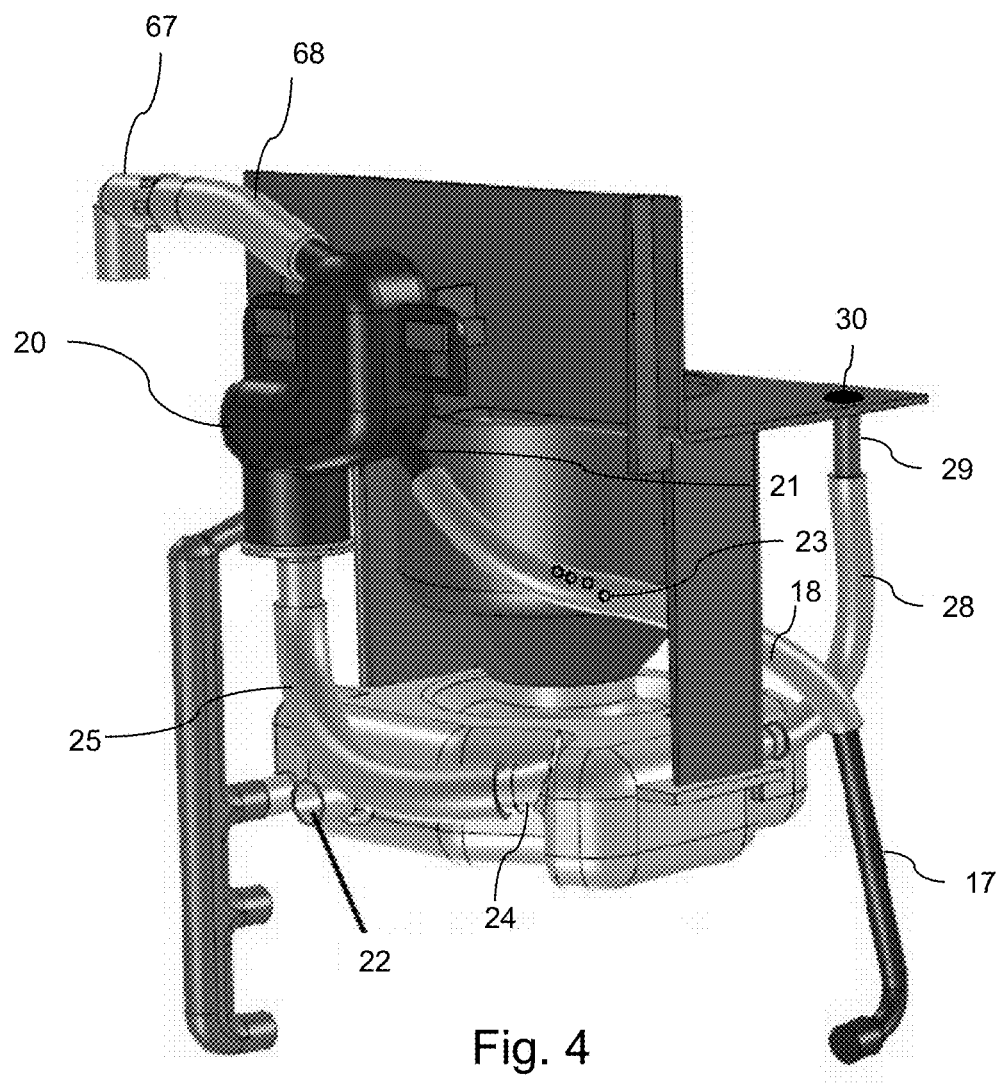
FIG. 4 is a detailed drawing of a rear view of the portable hydrogen supplemental system according to the present invention.

A main power board 36 is disposed at a rear side, for example, of the system 1 and configured to supply power to the system 1 using power received via power terminals 37 and 38 (as depicted in FIG. 3). A connector 36a is provided for connecting an OBD interface of the system 1 thereto. Further, power terminals 37 and 38 are connected to a vehicle battery for supplying power to the system 1. A heat sink 39 is also provided on the main power board 36 for dissipating heat and cooling components of the main power board 36.

Referring back to FIG. 1, the fuel cell 5, which is commonly known to produce electricity, is operated in reverse to produce hydrogen and oxygen gases. Thus, the fuel cell 5 essentially operates as an electrolyzer, which as described above decomposes nonelectrolyte water 9 into hydrogen gas and oxygen gas and is hereinafter referred to as an electrolyzer 5. Nonelectrolyte water 9 fills the electrolyzer 5 from the nonelectrolyte water tank 6 and when a voltage, having positive and negative terminals, is placed across the electrolyzer 5 supplied from the main power board 36, hydrogen and oxygen gases 22 and 23 are produced, on opposing sides of the electrolyzer 5.

During operation of the electrolyzer 5, the oxygen gas bubbles 22 are generated in the fuel cell 5 and released from one of the water inlet fittings 13a and 13b which also functions as an oxygen gas outlet fitting, back through the supply means 12 and is vented out of a rear side of the system 1 via the supply means 12. Further, hydrogen gas 23 is generated in the fuel cell 5 and supplied to the hydrogen gas collector 20. A small amount of non-electrolyte water 9 will exit from the hydrogen gas outlet fitting 15 as the hydrogen gas is produced. The hydrogen gas collector 20 is configured to collect the hydrogen gas 23 and the nonelectrolyte water output from the fuel cell 5. Since the oxygen gas bubbles 22 are released back through the supply means 12, any nonelectrolyte water 9 in contact with the oxygen gas bubbles 22 remains within the supply means 12 for supplying to the electrolyzer 5. Any nonelectrolyte water 9 exiting from the hydrogen gas outlet fitting 15 with the hydrogen gas 23 is collected in the hydrogen collector 20 is returned to the nonelectrolyte water tank 6 via a water return port 24 of the tank 6, for returning the nonelectrolyte water 9 by a tube or other supply means 25 to the nonelectrolyte water tank 6 via the water return port 24, for water preservation. The nonelectrolyte water 9 that comes out of the hydrogen outlet fitting 15 and the water inlet fittings 13 and 13a during hydrogen and oxygen production is therefore maintained in the nonelectrolyte water tank 6. Additional details regarding the hydrogen gas collector 20 will be discussed below with reference to FIGS. 6A and 6B. Based on the configuration of the system 1, the hydrogen gas and the oxygen gas generated in the electrolyzer 5 travel in different directions and are therefore kept separate from each other.

According to the invention the electrolyzer 5 can, for example, be a proton exchange membrane or polymer electrolyte membrane (PEM) electrolyzer. A PEM electrolyzer includes a semipermeable membrane generally made from ionomers and designed to conduct protons while being impermeable to gases such as oxygen or hydrogen. This is their essential function when incorporated into a membrane electrode assembly (MEA) of a proton exchange membrane fuel cell or of a proton exchange membrane electrolyzer: separation of reactants and transport of protons.

As known an electrolyzer is a device that generates hydrogen and oxygen from water through the application of electricity and includes a series of plates through which water flows while low voltage direct current is applied. Electrolyzers split the water into hydrogen and oxygen gases by the passage of electricity, normally by breaking down compounds into elements or simpler products.

Figure 5:
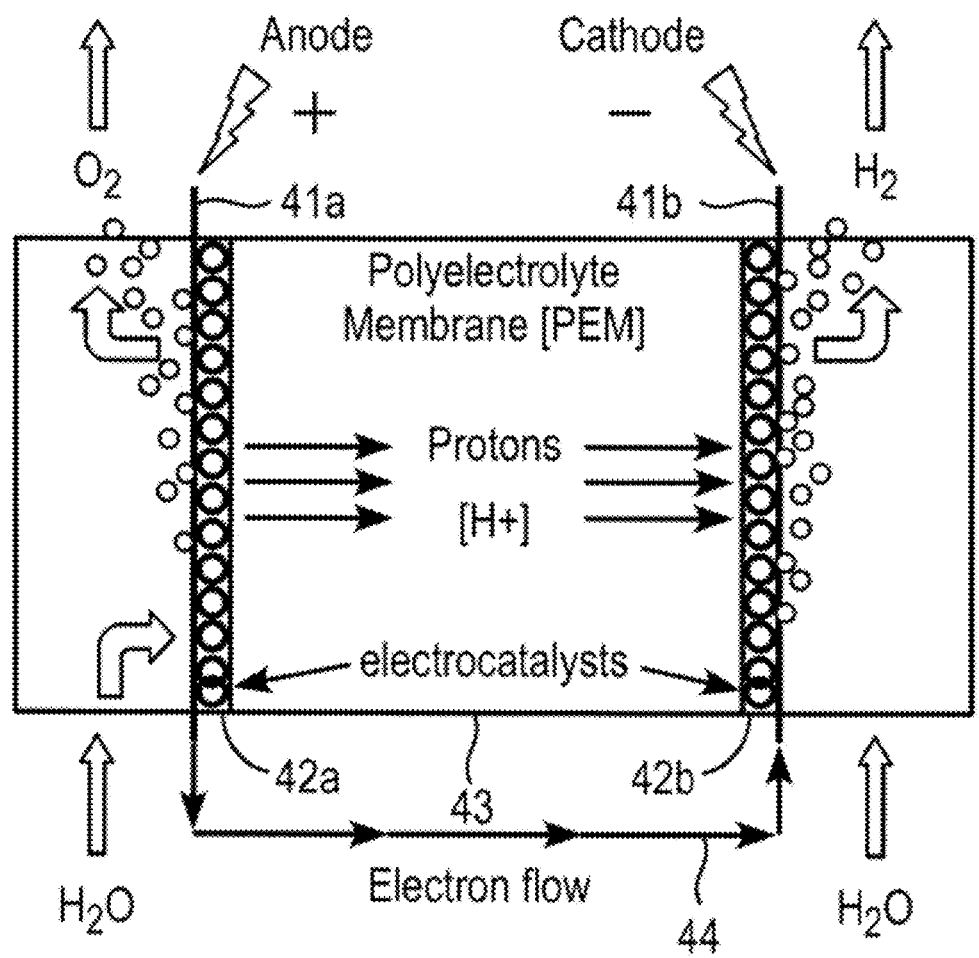
FIG. 5 is a diagram illustrating the operation and details of a PEM electrolyzer according to the present invention.

A PEM electrolyzer is shown in FIG. 5. The PEM electrolyzer includes a plurality of layers which are non-liquid layers including at least two external layers and an internal layer, including external electrodes 41 disposed opposite to each other one of which is the anode 41a and the other of which is the cathode 41b, electrocatalysts 42a and 42b disposed respectively on the anode 41a and the cathode 41b, and a membrane 43 disposed between the electrocatalysts 42a and 42b. The PEM electrolyzer further includes an external circuit 44 which applies electrical power to the anode 41a and the cathode 41b in a manner such that electrical power in the form of electrons flow from the anode 41a, along the external circuit 44, to the cathode 41b and protons are caused to flow through the membrane 43 from the anode 41a to the cathode 41b.

The efficiency of a PEM electrolyzer is a function primarily of its membrane and electro-catalyst performance. The membrane 43 includes a solid fluoropolymer which has been chemically altered in part to contain sulphonic acid groups, $SO_3H$, which easily release their hydrogen as positively-charged atoms or protons $H^+$:

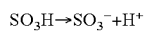

$$SO_3H \rightarrow SO_3^- + H^+$$

These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer side-chain. Thus, when an electric field is applied across the membrane 43 the hydrated protons are attracted to the negatively charged electrode, known as the cathode 41b. Since a moving charge is identical with electric current, the membrane 43 acts as a conductor of electricity. It is said to be a protonic conductor.

A typical membrane material that is used is called "nafion". Nafion is a perfluorinated polymer that contains small proportions of sulfonic or carboxylic ionic functional groups.

Accordingly, as shown in FIG. 5, nonelectrolyte water 9 enters the electrolyzer 5 and is split at the surface of the membrane 43 to form protons, electrons and gaseous oxygen. The gaseous oxygen leaves the electrolyzer 5 while the protons move through the membrane 43 under the influence of the applied electric field and electrons move through the external circuit 44. The protons and electrons combine at the opposite surface, namely the negatively charged electrode, known as the cathode 41b, to form pure gaseous hydrogen.

Figure 6A:
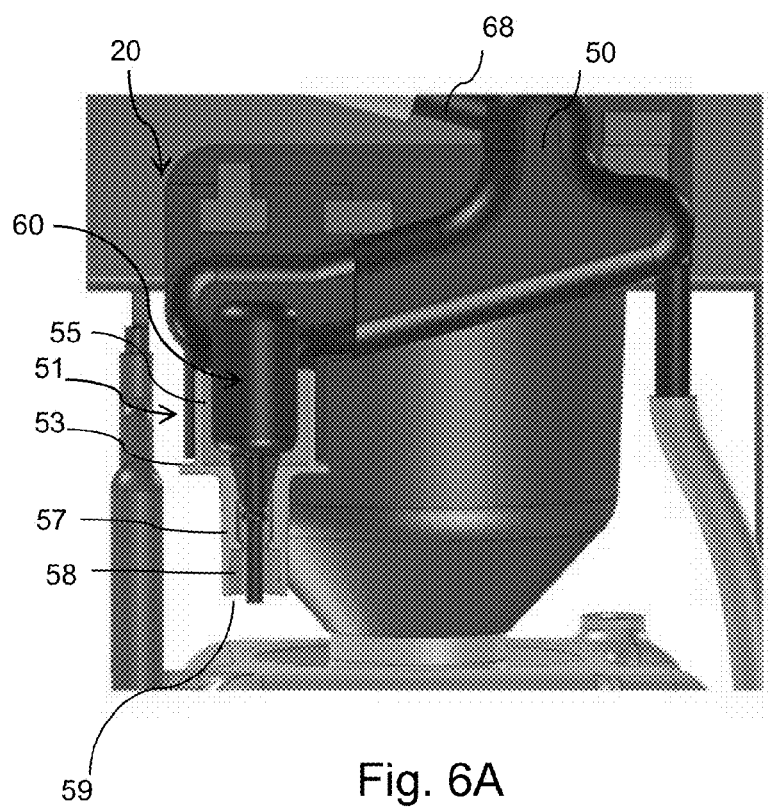
FIGS. 6A-B are diagrams of an embodiment of the hydrogen gas collector 20 according to the present invention.
Figure 6B:
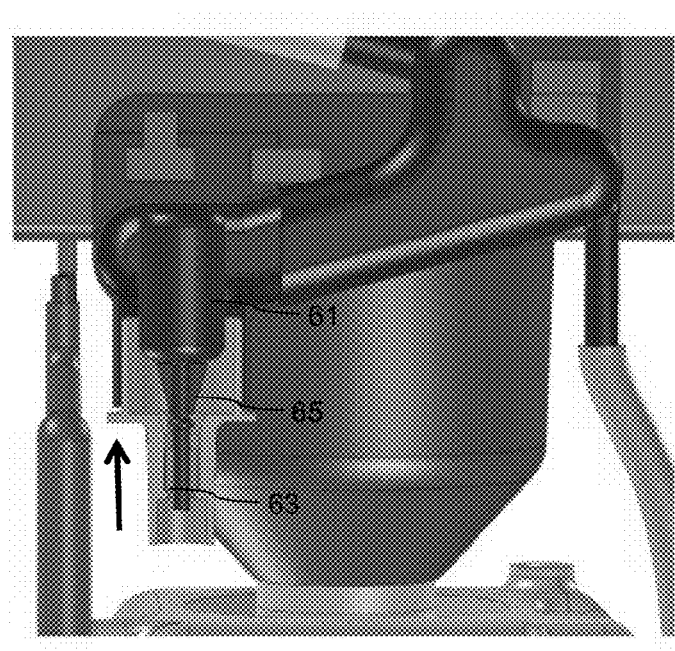

As shown in FIGS. 6A and 6B, an embodiment of the hydrogen gas collector 20 includes a hydrogen collection portion 50 configured to receive the hydrogen gas and the small amount of nonelectrolyte water 9 from the electrolyzer 5, a valve 51 is disposed in communication with the hydrogen collection portion 50, for receiving the nonelectrolyte water 9 therein to be returned to the nonelectrolyte water tank 6.

According to one more embodiments, the valve 51 includes a valve body 53 having a first receiving section 55 at a top thereof and a second receiving section 57 formed of a through-hole 58 at a bottom thereof. Flange portions 57a are formed between the first receiving section 55 and the second receiving section 57, and a return outlet 59 is provided to be connected with the water return port 24 of the nonelectrolyte water tank 6. The valve 51 further includes a float device 60. The float device 60 includes a top portion 61 thereof disposed within the first receiving section 55 and a bottom portion 63 thereof disposed within the through-hole 58 of the second receiving section 57. A stopper 65 is disposed along a side surface of the bottom portion 63. According to an embodiment, the float device 60 may be formed of a plastic material, and the stopper 65 may be formed of an elastomer material, for example.

During operation of the hydrogen gas collector 20, hydrogen gas is collected in the hydrogen collection portion 50 and any nonelectrolyte water 9 traveling with the hydrogen gas bubbles 23 is circulated to the valve body 53 to be returned to the nonelectrolyte water tank 6 via the supply means 25. The stopper 65 is configured to stop or block the hydrogen gas from returning to the nonelectrolyte water tank 6. As the water level in the valve body 53 rises, the float device 60 gradually floats in an upward direction as shown in FIG. 6B, to release the nonelectrolyte water 9 in a downward direction back to the nonelectrolyte water tank 6. Further, the hydrogen gas is released in an upward direction to a hydrogen outlet fitting 67 via a tube or other supply means 68.

Figure 7A:
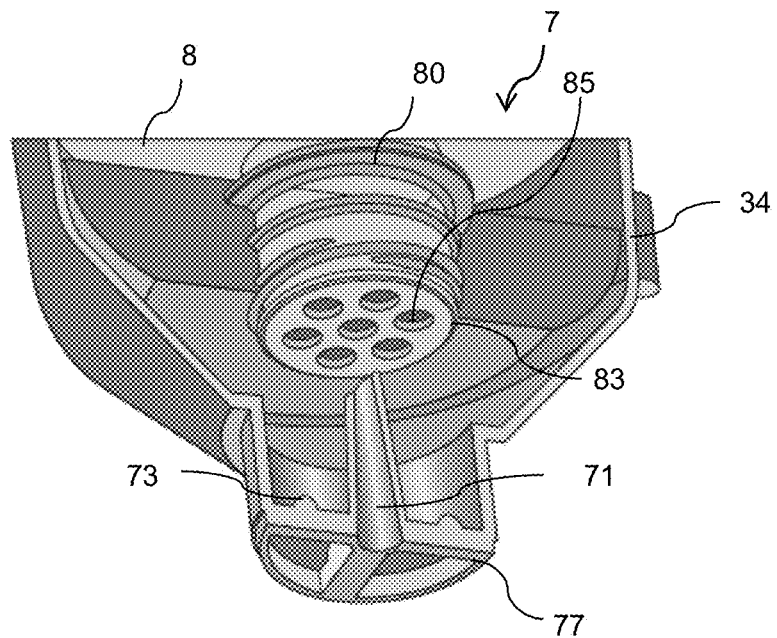
FIGS. 7A-B are diagrams of an embodiment of the cup portion receiving the water container according to the present invention.
Figure 7B:
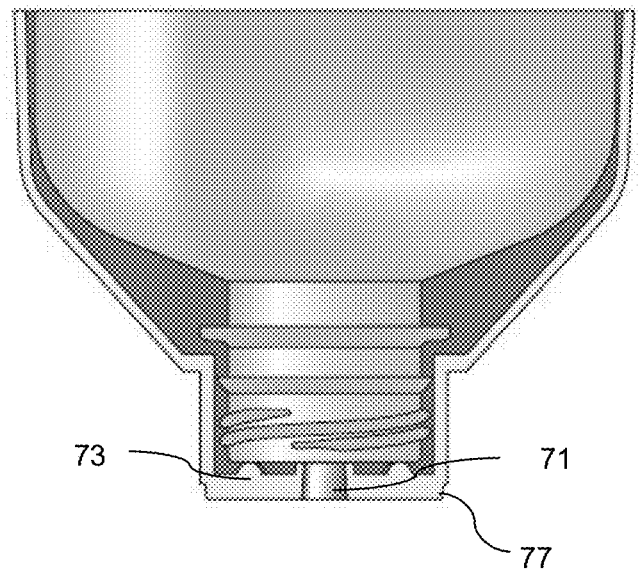

FIGS. 7A and 7B illustrate an embodiment of the cup portion 7 receiving the water container 8 as shown in FIG. 1. According to one or more embodiments, the receiving portion 34 of the cup portion 7 further includes a protruding portion 71 at a center thereof and a support member 73 surrounding the protruding portion 75 disposed on a bottom surface 77 thereof.

In one or more embodiments, the water container 8 includes threading portions 80 on a side surface 82 thereof and a top portion 83 comprising a plurality of through-holes 85 for supply water therethrough. The water container 8 is flipped over such that the top portion 83 is inserted into the receiving portion 34. The protruding portion 75 is configured to pierce at least one of the through-holes 85 in order to release nonelectrolyte water 9 from the water container 7, to thereby be supplied to the nonelectrolyte water tank 6. As shown in FIG. 7B, the support member 73 supports the position of the top portion 83 when resting on the bottom surface 77 of the cup portion 7 and pierced by the protruding portion 75.

According to one or more embodiments, the nonelectrolyte water 9 is released from the water container 8 in intermittently or non-continuously such that when a water level of the nonelectrolyte water tank 6 reaches a predetermined level, the water container 8 discontinues the supply of nonelectrolyte water 9 into the nonelectrolyte water tank 6, to avoid overflowing the nonelectrolyte water tank 6.

Figure 8:
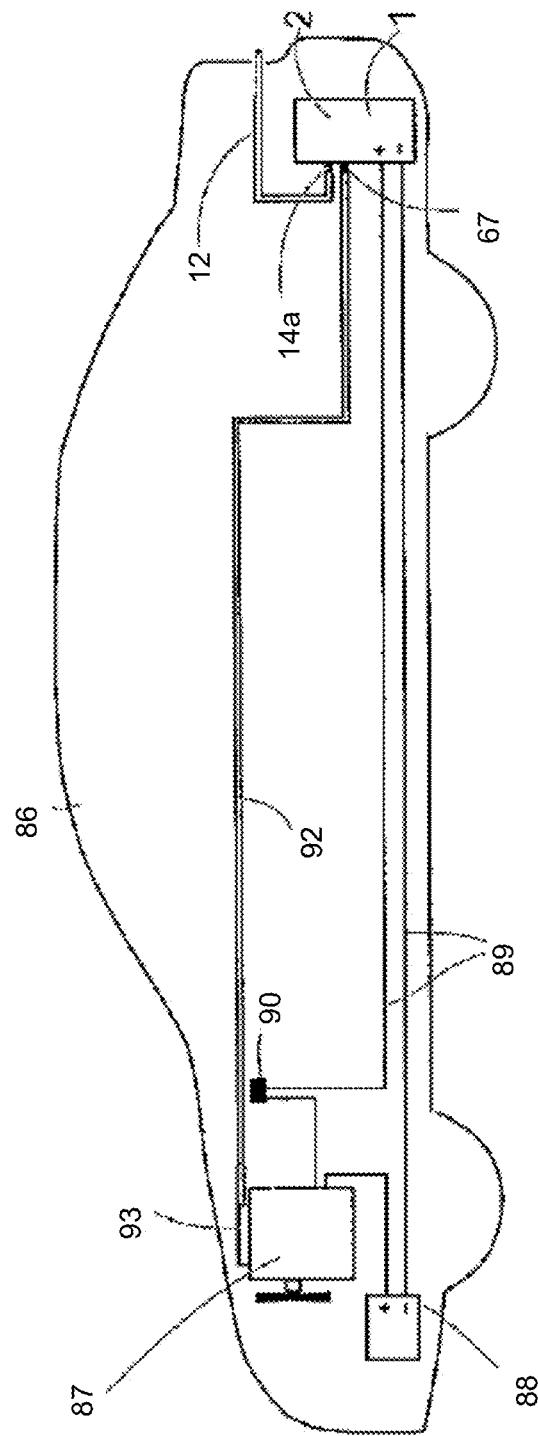
FIG. 8 is a schematic showing a portable hydrogen supplemental system installed in a typical vehicle according to the present invention.
Figure 10:
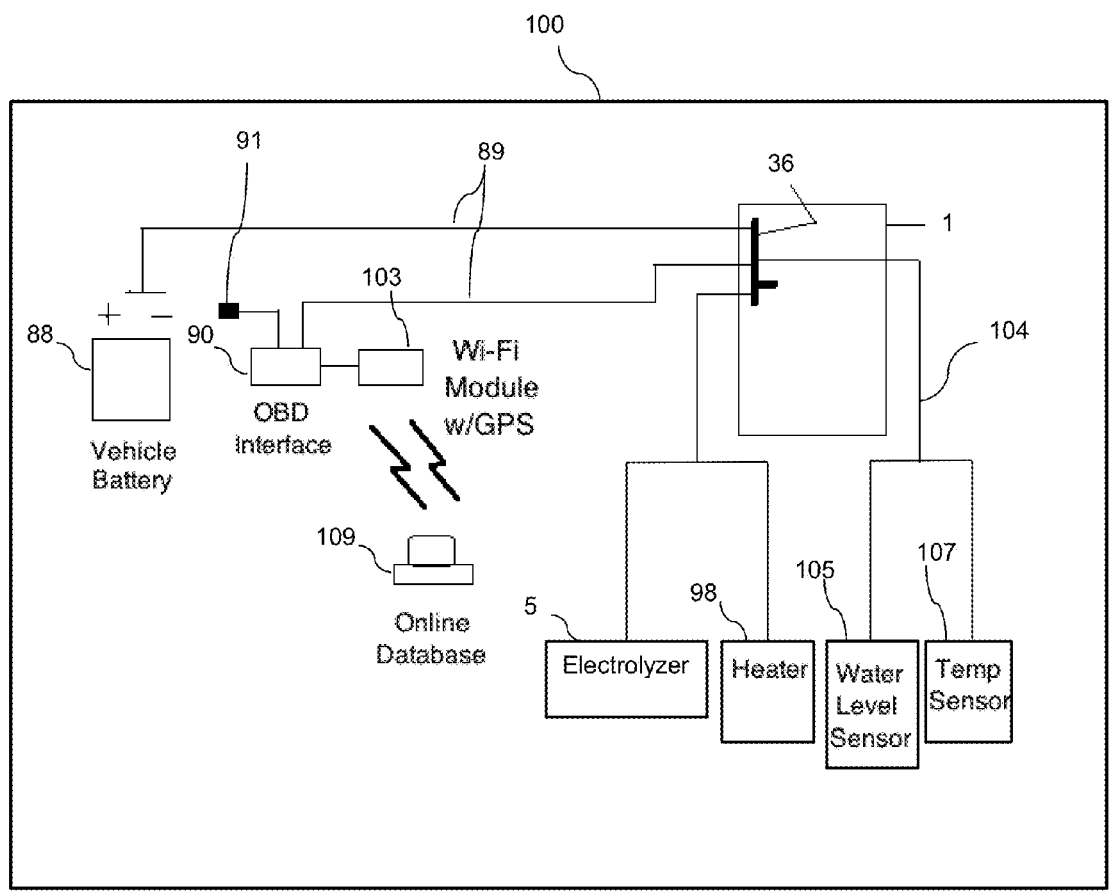
FIG. 10 is a diagram of an embodiment of a control circuit of the present invention.

As shown in FIG. 8, a vehicle 86 powered by a gasoline or diesel engine 87 is equipped with the portable hydrogen supplemental system 1. Power is supplied to the portable hydrogen supplemental system 1 by a vehicle battery 88 connected to electrical wires 89. The electrical circuit to the portable hydrogen supplemental system 1 includes an on-board diagnostic (OBD) interface 90 in communication with the engine 87 via a vehicle OBD terminal 91 (as depicted in FIG. 10), and in communication with the main power board 36 of the system 1. The OBD interface 90 completes the electrical circuit to the portable hydrogen supplemental system 1 when the engine is running (e.g., based on the rotational speed of the vehicle 81). The vehicle OBD terminal 91 is used to perform self-diagnostic of the vehicle. The OBD terminal 91 enables an operator of the vehicle 86 to access to state of health information for various vehicle sub-systems. Once power is supplied to the portable hydrogen supplemental system 1, hydrogen gas flows thru a hydrogen outlet tube 92 connected to hydrogen outlet fitting 67 of the housing unit 2 to an air intake 93 of the vehicle's engine 87. Oxygen gas flows thru the supply means 12 and, in the case of gasoline engines with oxygen sensors, is vented to the atmosphere. The two gasses can optionally be combined for diesel engine vehicles or other internal combustion engines without oxygen sensors.

Figure 9:
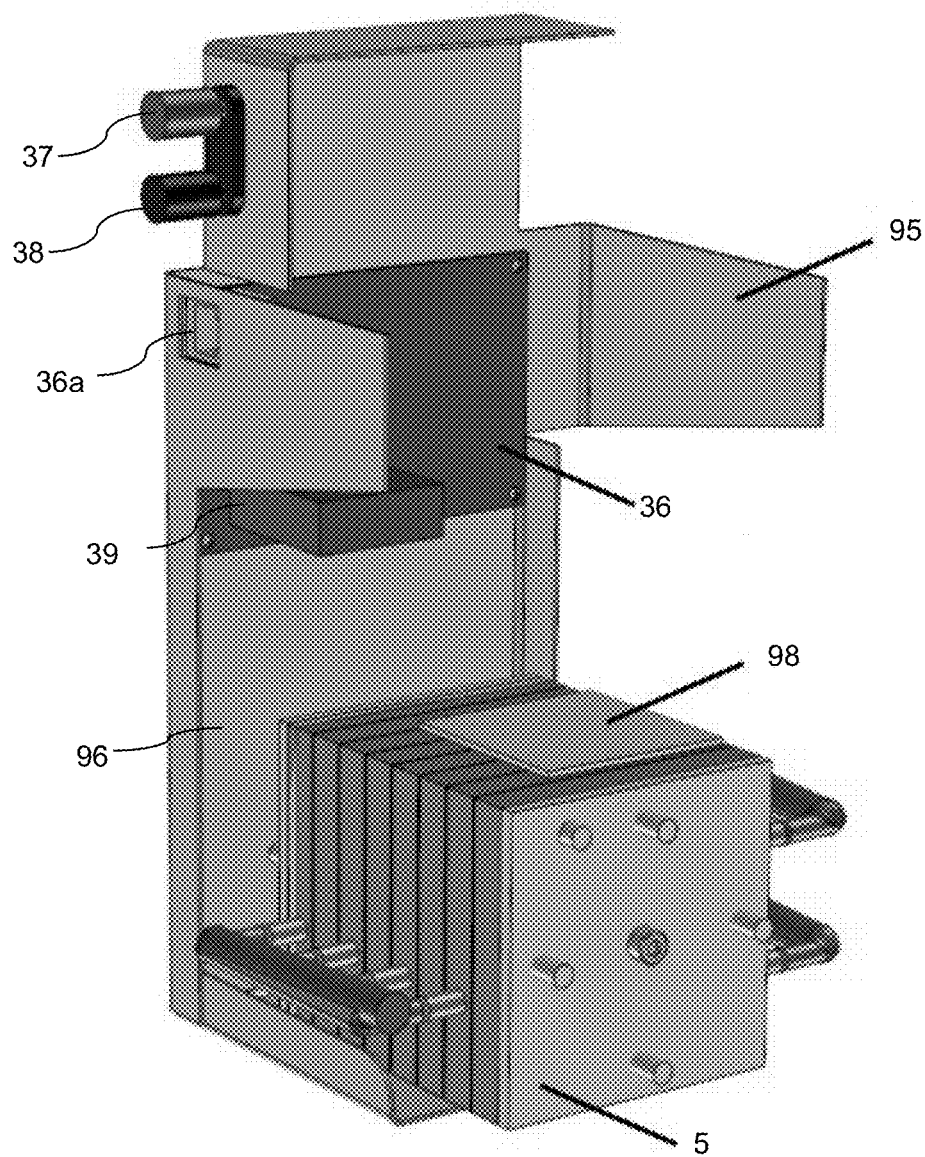
FIG. 9 is a diagram of an embodiment of a sub-housing assembly according to the present invention.

An embodiment of a sub-housing or chassis 95 is illustrated in FIG. 9. The sub-housing 95 includes the electrolyzer 5 mounted at a lower portion 96 thereof, and the main power board 36, the power terminals 37 and 38, and the heat sink 39 are mounted at an upper portion 97 thereof. A heater 98 may be mounted on the sub-housing 95 or adjacent to the electrolyzer 5 for heating the nonelectrolyte water 9 when needed. The sub-housing 95 is mounted within housing 2. The housing unit 2 being removable from the mounting bracket 3 permits the user to remove the system 1 for servicing including adding water, performing repairs, exchanging parts, and the like.

The electrical circuit can, for example, be provided by a control circuit 100 as illustrated in FIG. 10 for controlling the system 1. The control circuit 100 includes the OBD interface 90 in communication with the vehicle OBD terminal 91 and the main power board 36. The vehicle battery 88 is connected with the power terminals 37 and 38 at the main power board 36. The control circuit 100 further includes a communication module 103 equipped with a global positioning system (GPS). According to one or more embodiments, the communication module 103 is a wireless module for wirelessly transmitting vehicle information via the OBD interface 90. The OBD interface 90 is configured to receive at least one or more data output of the OBD terminal 91, such as rotational speed (RPM) information, speed information, gas usage information, etc. When it is detected that the vehicle 86 is running, the OBD interface 90 sends a signal via the wire 89 to the main control board 36, to operate the system 1. For example, when the rotational speed of the engine 87 exceeds a predetermined level, a positive output is sent to the main power board 36, thereby causing the electrolyzer 5 to operate when the engine 87 is running. The hydrogen gas may be generated based on the vehicle speed such that when the vehicle 86 exceeds a predetermined speed the electrolyzer 5 is operated to generate hydrogen gas.

Other components of the system 1 are also connected with the main power board 36 via wires 104. The other components include the electrolyzer 5, the heater 98, a water level sensor 105 and a temperature sensor 107.

According to one or more embodiments of the present invention, the OBD interface 90 is in communication with a database 109 (e.g., a web-based database), via the communication module 103, for receiving vehicle information and system information including status information. The status information may include, for example, water level information from the water level sensor 105 and temperature sensor information from the temperature sensor 107. The database 109 may further store historical data collected over time to be used to control operation or regulate maintenance of the system 1. For example, necessary replacement of the water container 8 may be determined based on the status information of the water level within the nonelectrolyte water tank 6. The portable hydrogen supplemental system 1 operates optimally in a gasoline powered engine when the load on the engine does not exceed a predetermined level and the amount of hydrogen produced by the portable hydrogen supplemental system 1 and supplied to the gasoline powered engine falls within a preset range.

In a gasoline powered engine the electrical power used by the Hydrogen supplemental system is supplied by the engine alternator. As described above the electrical power is only supplied when the engine is operating and/or the speed of the automobile exceeds a predetermined level. Thus, the load placed on the engine by the portable hydrogen supplemental system 1 is related to the amount of electrical power drawn from the alternator as measured in amps. Optimally the portable hydrogen supplemental system 1 works best on a gasoline powered engine when the load on the engine does not exceed a current of 4 amps being drawn from the alternator, or if measured another way of 56 watts. It should be noted that the amount of amps or watts is dependent upon the size of the engine and alternator (four, six or eight cylinders, etc.). It should also be noted that diesel engines have a different optimal load setting.

Further, in a gasoline powered engine the optimal amount of hydrogen produced by the Hydrogen supplemental system and supplied to the gasoline powered engine falls within a preset range of 0.10-0.25 liters per minute.

Based on the above a gasoline powered automobile achieves the highest level of fuel efficiency measured in miles/gallon of gas when the load on the engine does not exceed 4 amps, or if measured another way of 56 watts, and the amount of hydrogen produced and supplied to the gasoline powered engine falls within a preset range of 0.10-0.25 liters per minute.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A portable hydrogen supplemental system for supplying hydrogen gas to an internal combustion engine comprising:
 a housing unit;
 an electrolyzer mounted inside the housing unit that separates nonelectrolyte water into hydrogen and oxygen gas in response to electrical power;
 a nonelectrolyte water tank mounted inside the housing unit and positioned to supply nonelectrolyte water to the electrolyzer;
 a power supply for supplying the electrical power in the form of a voltage to the electrolyzer; and
 an onboard diagnostic interface for interfacing with an onboard diagnostic terminal of a vehicle, for detecting operation of the internal combustion engine;
 a hydrogen gas collector for collecting the hydrogen gas from the electrolyzer;
 wherein the electrolyzer, when supplied with electrical power produces the hydrogen and oxygen gases from the nonelectrolyte water being supplied from the nonelectrolyte water tank via a supply line connected thereto, and supplies the hydrogen gas being produced, via the hydrogen gas collector, to the internal combustion engine for combustion therein,
 wherein the electrolyzer is disposed external of the nonelectrolyte water tank, wherein the oxygen gas supplied from the electrolyzer travels back through the supply line and is vented to an atmosphere;

wherein said electrolyzer comprises:
a plurality of layers, said layers being non-liquid and each layer being in adjacent contact with another one of said layers,
wherein the plurality of layers includes at least two external layers and an internal layer which is disposed in adjacent contact between the external layers,
wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and
wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer;

a water container for supplying the nonelectrolyte water to the nonelectrolyte water tank; and a cup portion connected with a fill spout of the nonelectrolyte water tank, for receiving the water container therein,
wherein the cup portion comprises: a receiving portion for receiving the water container therein; a protruding portion at a center thereof; and a support member surrounding the protruding portion, wherein the protruding member and the support member are disposed on a bottom surface of the cup portion,
wherein the water container comprises: a plurality of threading portions for threading the water container into the receiving portion; a top portion being inserted into the receiving portion and comprising plurality of through-holes along a surface thereof,
wherein the protruding portion is configured to pierce at least one the through-holes to release the nonelectrolyte water from the water container and to supply the nonelectrolyte water to the nonelectrolyte water tank, and
wherein the support member is configured to support a position of the top portion of the water container.

2. A portable hydrogen supplemental system according to claim 1, wherein the hydrogen gas collector comprises:
a hydrogen gas collector portion for receiving the hydrogen gas and an amount of the nonelectrolyte water mixed with the hydrogen gas, from the electrolyzer, therein; and
a valve disposed in communication with the hydrogen collection portion, for receiving the nonelectrolyte water therein to be returned to the nonelectrolyte water tank.

3. A portable hydrogen supplemental system according to claim 1, wherein the valve comprises: a valve body including a first receiving section and a second receiving section formed of a through-hole at a bottom thereof; and a return outlet provided to be connected with the nonelectrolyte water tank; a float device including a top portion disposed within the first receiving section; and a bottom portion disposed within the through-hole of the second receiving section, and configured to float as the nonelectrolyte water fills the valve body.

4. A portable hydrogen supplemental system according to claim 3, wherein the hydrogen gas collector collects hydrogen gas and nonelectrolyte water traveling with the hydrogen gas is circulated to the valve body to be returned to the nonelectrolyte water tank.

5. A portable hydrogen supplemental system according to claim 4, further comprising:
a stopper disposed on a side surface of the float device and configured to block the hydrogen gas from returning to the nonelectrolyte water tank.

6. A portable hydrogen supplemental system according to claim 1, wherein the onboard diagnostic interface is in communication with the engine via the onboard diagnostic terminal and in communication with the power supply of the system, and controls power to be supplied to the power supply.

7. A portable hydrogen supplemental system according to claim 6, further comprising:
a communication module for transmitting vehicle information via the onboard diagnostic terminal to the power supply via a communication network.

8. A portable hydrogen supplemental system according to claim 7, wherein the communication module is a wireless module for wirelessly receiving and transmitting vehicle information.

9. A portable hydrogen supplemental system according to claim 8, wherein the onboard diagnostic interface is configured to receive at least one of rotational speed information, speed information, or gas usage information.

10. A portable hydrogen supplemental system according to claim 1, further comprising:
a temperature sensor mounted within the housing and configured to sense a temperature of the nonelectrolyte water to be supplied to the electrolyzer;
a heater mounted within the housing and configured heat the nonelectrolyte water to be supplied to the electrolyzer when the nonelectrolyte water is above a predetermined temperature.

11. A portable hydrogen supplemental system according to claim 1, further comprising:
a water level sensor mounted within the nonelectrolyte water tank and configured to sense a water level of the nonelectrolyte water tank,
wherein the nonelectrolyte water is released intermittently from the water container, such that when the water level of the nonelectrolyte water tank reaches a predetermined level, the water container discontinues a supply of nonelectrolyte water into the nonelectrolyte water.

12. A method of supplying hydrogen gas to an internal combustion engine comprising:
supplying, from a nonelectrolyte water tank mounted inside the housing unit, nonelectrolyte water to an electrolyzer;
detecting, by an onboard diagnostic interface in communication with a vehicle onboard diagnostic terminal, operation of the internal combustion engine;
supplying, by a power supply, electrical power in the form of a voltage to the electrolyzer upon detecting that the internal combustion engine is in operation;
producing, by the electrolyzer when supplied with the electrical power, hydrogen and oxygen gases from the nonelectrolyte water from the nonelectrolyte water tank; and
supplying, via a hydrogen gas collector, the hydrogen gas being produced to the internal combustion engine for combustion therein,
wherein the electrolyzer, when supplied with electrical power produces the hydrogen and oxygen gases from the nonelectrolyte water being supplied from the nonelectrolyte water tank via a supply line connected thereto, and supplies the hydrogen gas being produced, via the hydrogen gas collector, to the internal combustion engine for combustion therein, wherein the electrolyzer is disposed external of the nonelectrolyte water tank, wherein the oxygen gas supplied from the electrolyzer travels back through the supply line and is vented to an atmosphere, wherein said electrolyzer comprises a plurality of layers, said layers being non-liquid and each layer being in adjacent contact with another one of said layers, wherein the plurality of layers includes at least two external layers and an internal layer which is disposed in adjacent contact between the external layers, wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer;

supplying the nonelectrolyte water via a water container disposed above the nonelectrolyte water, wherein the water container comprises: a plurality of threading portions for threading the water container into the receiving portion, a to portion being inserted into the receiving portion and comprising plurality of through-holes along a surface thereof;

receiving the water container via a cup portion disposed on a top of the nonelectrolyte water tank, wherein the cup portion comprises a receiving portion for receiving the water container therein, a protruding portion at a center thereof, and a support member surrounding the protruding portion, wherein the protruding member and the support member are disposed on a bottom surface of the cup portion; and piercing a top portion of the water container by a protruding portion at a center of a receiving portion of the cup portion, wherein the protruding portion is configured to pierce at least one the through-holes to release the nonelectrolyte water from the water container and to supply the nonelectrolyte water to the nonelectrolyte water tank, wherein the nonelectrolyte water is released intermittently from the water container, such that when the water level of the nonelectrolyte water tank reaches a predetermined level, the water container discontinues a supply of nonelectrolyte water.

13. A method according to claim 12, further comprising:

receiving via the hydrogen gas collector, the hydrogen gas and an amount of the nonelectrolyte water mixed with the hydrogen gas, from the electrolyzer, therein; returning, via a valve within the hydrogen gas collector, the amount of nonelectrolyte water to the nonelectrolyte water tank.

14. A method according to claim 12, further comprising:

controlling the power supply via the onboard diagnostic interface in communication with the engine; and a communication module transmitting vehicle information via the onboard diagnostic interface to the power supply via a communication network.

15. A method according to claim 14, wherein the onboard diagnostic interface is configured to receive at least one of rotational speed information, speed information, or gas usage information.

\* \* \* \* \*